US007587216B2

United States Patent
Patel et al.

(10) Patent No.: US 7,587,216 B2
(45) Date of Patent: Sep. 8, 2009

(54) METHOD AND COMMUNICATIONS UNIT FOR SELECTIVE RECEIPT OF GROUP CALLS

(75) Inventors: Swetal A. Patel, Plantation, FL (US); Pragneshkumar B. Goyani, Plantation, FL (US); Jyh-Han Lin, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 621 days.

(21) Appl. No.: 11/119,248

(22) Filed: Apr. 29, 2005

(65) Prior Publication Data

US 2006/0246934 A1 Nov. 2, 2006

(51) Int. Cl.
*H04B 7/00* (2006.01)
*H04Q 7/20* (2006.01)

(52) U.S. Cl. .............. 455/519; 455/518; 455/415; 455/509

(58) Field of Classification Search ............. 455/518, 455/416, 519, 520, 417, 517, 415, 414.1, 455/509, 450, 452.1, 510, 512, 521, 67.11
See application file for complete search history.

(56) References Cited

U.S. PATENT DOCUMENTS

| 5,629,688 | A * | 5/1997 | Muramatsu et al. | 340/7.47 |
| 6,208,872 | B1 * | 3/2001 | Schmidt | 455/518 |
| 6,405,050 | B1 * | 6/2002 | Amirijoo et al. | 455/518 |
| 7,035,658 | B2 * | 4/2006 | Drozt et al. | 455/519 |

OTHER PUBLICATIONS

PCT International Search Report Dated Dec. 26, 2006 for Application No. PCT/US06/12168—Motorola, Inc.—6 Pages.

* cited by examiner

*Primary Examiner*—John J Lee
(74) *Attorney, Agent, or Firm*—Larry G. Brown

(57) ABSTRACT

The invention concerns a method (300) and communications unit (112) for selective receipt of group calls. The method can include the steps of—at a communications unit—receiving (314) a request to participate in a group call having at least one identification and having a plurality of participating members, comparing (316) the identification associated with the group call with a set of predefined blocking configurations and selectively blocking (318) the request to participate in the group call based on the comparison of the identification associated with the group call with the set of predefined blocking configurations.

20 Claims, 3 Drawing Sheets

METHOD AND COMMUNICATIONS UNIT FOR SELECTIVE RECEIPT OF GROUP CALLS

BACKGROUND OF THE INVENTION

1. Field of the Invention

This invention relates in general to receiving incoming calls and more particularly, to selectively receiving incoming group calls.

2. Description of the Related Art

The use of portable electronic devices, like cellular telephones or two-way radios, has exploded in recent years. In response, manufacturers have introduced various models capable of performing numerous functions. As an example, Motorola, Inc. of Schaumburg, Ill. has developed handsets that are capable of making both interconnect and dispatch calls. On the dispatch side, users of the handsets have the option of generating groups of individuals, and at any particular time, a single call can be placed to all the individuals that are part of that group.

Until recently, to set up a group, a user had to contact the wireless carrier providing service for the handset. The wireless carrier, once it received the request, would assign a group identification number (group ID) to the group. The network could then rely on this group ID to set up the group call. In addition to the inconvenience of contacting the wireless carrier to set up the group, once created, the group ID was fixed, which could lead to problems removing members from or adding members to the group. In fact, to add or remove members from the group, a person was required to contact the wireless carrier to do so.

To overcome these drawbacks, newer handsets include a feature that permits a user to create a group without the assistance of the wireless carrier. In particular, a user, using his or her handset, can select members to generate a group. Even better, the user, through the handset, can add members to or remove members from the group at will. The members can be selected from a menu displayed on the handset. When a group call is placed, however, each person that is a part of the group will automatically receive the call. For example, once the call is set up, a target unit may immediately begin broadcasting audio, which may lead to unwanted interruptions.

SUMMARY OF THE INVENTION

The present invention concerns a method for selective receipt of group calls. The method can include the steps of—at a communications unit—receiving a request to participate in a group call having at least one identification and having a plurality of participating members and comparing the identification associated with the group call with a set of predefined blocking configurations. The method can also include the step of selectively blocking the request to participate in the group call based on the comparison of the identification associated with the group call with the set of predefined blocking configurations.

As an example, the identification associated with the group call can be at least one of a group name, identifications for each of the participating members and a status of at least one of the participating members. As another example, the set of predefined blocking configurations can include at least one of a group name, an identification of at least one participating member and the status of at least one of the participating members. The set of predefined blocking configurations may also include at least one of a geographical restriction and a temporal restriction associated with at least one of the group name, the identification of the at least one participating member and the status of the participating members.

The method can also include the step of selecting the identification associated with the group call from a menu at the communications unit to selectively block the group call. In response to the blocking of the request, the method can also include the step of transmitting a signal indicating that the communications unit will not participate in the group call. The method can further include the step of providing an indication of a conflict in response to comparing the identification associated with the group call with the set of predefined blocking configurations.

In another arrangement, the method can include the steps of initially accepting the request to participate in the group call when the identification associated with the group call is not within the set of predefined blocking configurations and providing notice when at least one newly-participating member joins in the group call if an identification of the newly-participating member is within the set of predefined blocking configurations. The method can include the step of terminating the group call in response to the newly-participating member joining the group call. As an example, the communications unit can be a mobile communications unit.

The present invention also concerns a communications unit for selectively blocking a group call. The communications unit can include a transceiver that can receive a request to participate in a group call having at least one identification and having a plurality of participating members and a processor coupled to the transceiver. The processor can be programmed to compare the identification associated with the group call with a set of predefined blocking configurations and to selectively block the request to participate in the group call based on the comparison of the identification associated with the group call with the set of predefined blocking configurations. The communications unit can also include suitable software and circuitry for performing the processes described above.

The present invention also concerns a communications unit for selectively blocking a group call. The communications unit can include a transceiver that receives a request to participate in a group call, a user interface and a processor coupled to the transceiver and the user interface. The processor can be programmed to initially accept the request to participate in the group call when an identification associated with the group call is not within a set of predefined blocking configurations. The processor can also be programmed to provide notice through the user interface when at least one newly-participating member joins in the group call if an identification of the newly-participating member is within the set of predefined blocking configurations. The communications unit can also include suitable software and circuitry for performing the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
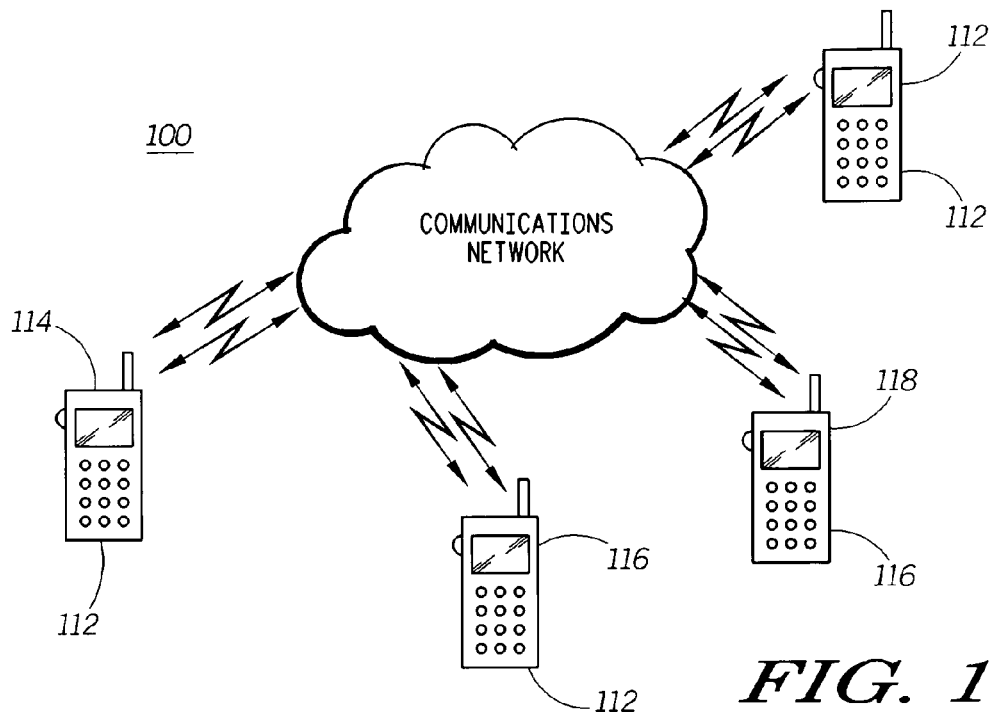
FIG. 1 illustrates a system for selective receipt of group calls in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The invention concerns a method and a communications unit for selectively receiving a group call. The method can include the steps of—at a communications unit—receiving a request to participate in a group call having at least one identification and having a plurality of participating members and comparing the identification associated with the group call with a set of predefined blocking configurations. The method can also include the step of selectively blocking the request to participate in the group call based on the comparison of the identification associated with the group call with the set of predefined blocking configurations.

The method can also include the step of initially accepting the request to participate in the group call when the identification associated with the group call is not within the set of predefined blocking configurations. Additionally, the method can include the step of providing notice when at least one newly-participating member joins in the group call if an identification of the newly-participating member is within the set of predefined blocking configurations. In either arrangement, a user can selectively block his or her participation in a group call.

Referring to FIG. 1, a communications system 100 is shown. The communications system 100 can include a communications network 110 and a plurality of communications units 112. As an example, the communications units 112 can be mobile communications units, such as cellular telephones, two-way radios, personal digital assistants, etc. The communications network 110 can be any suitable network capable of transmitting signals between any suitable number of communications units 112. In one particular arrangement, the communications network 110 can be a network that supports both interconnect and dispatch calls. The communications units 112 can also support both interconnect and dispatch calls. It is understood, however, that the invention is not limited to this particular example, as the invention can apply to any other suitable communications arrangement. For example, the communications units 112 can be configured to communicate with one another without the assistance of any communications network.

In another arrangement, the communications network 110 and the communications units 112 can support group calls. A group call can be any call having at least three participants. An example of a group call will be presented in which the group call is conducted over a dispatch communications system, although it is understood that the invention is in no way limited to dispatch calls.

One of the communications units 112 can be an originating communications unit 114 that can initiate a group call. The other communications units 112 that will participate in the group call can be referred to as target communications units 116. Thus, once set up, the user of the originating communications unit 114 can initiate the group call by, for example, pressing a push-to-talk (PTT) button, and the users of the target communications units 116 can respond, if they desire.

Figure 2:
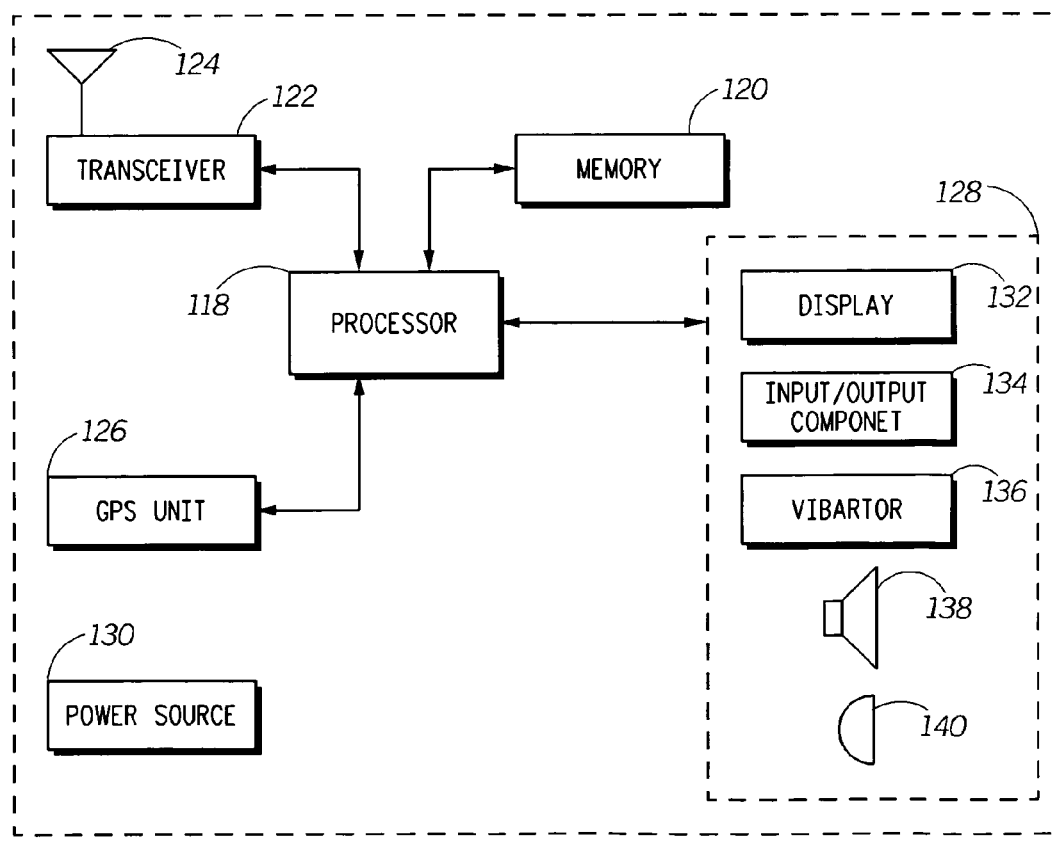
FIG. 2 illustrates an example of a communications unit for selective receipt of group calls in accordance with an embodiment of the inventive arrangements.

Referring to FIG. 2, an example of a communications unit 112 is shown. In one arrangement, the communications unit 112 can include a processor 118, a memory 120, a transceiver 122, an antenna 124, a global positioning system (GPS) unit 126, a user interface section 128 and a power source 130. The processor 118 can be communicatively coupled to the memory 120, the transceiver 122, the GPS unit 126 and the user interface section 128. The transceiver 122 can also be coupled to the antenna 124. As an example, the user interface section 128 can include a display 132, an input/output component 134, a vibrator 136, a speaker 138 and a microphone 140.

The transceiver 122 can transmit and receive wireless signals through the antenna 124 in accordance with well-known principles. The memory 120 can be any suitable type of storage that can store instructions for the processor 118 and any other data. As an example, the memory 120 can store the identities of the participants in a group call and can also store a set of blocking configurations. Any suitable type of memory can be used here. The GPS unit 126, as is known in the art, can determine the location of the communications unit 112.

The display 132 of the user interface section 128 can display any suitable images, and the input/out component 134 can permit the exchange of any suitable type of information between the communications device 112 and some other entity or unit. As an example but without limitation, the input/output component 134 can be a keypad or a data interface. The vibrator 136 can produce vibrations at the communications unit 112, and the speaker 138 can broadcast audio. The microphone 140 can capture audio, and the power source 130, which can be a rechargeable battery, can provide power to one or more of the components recited above.

Figure 3:
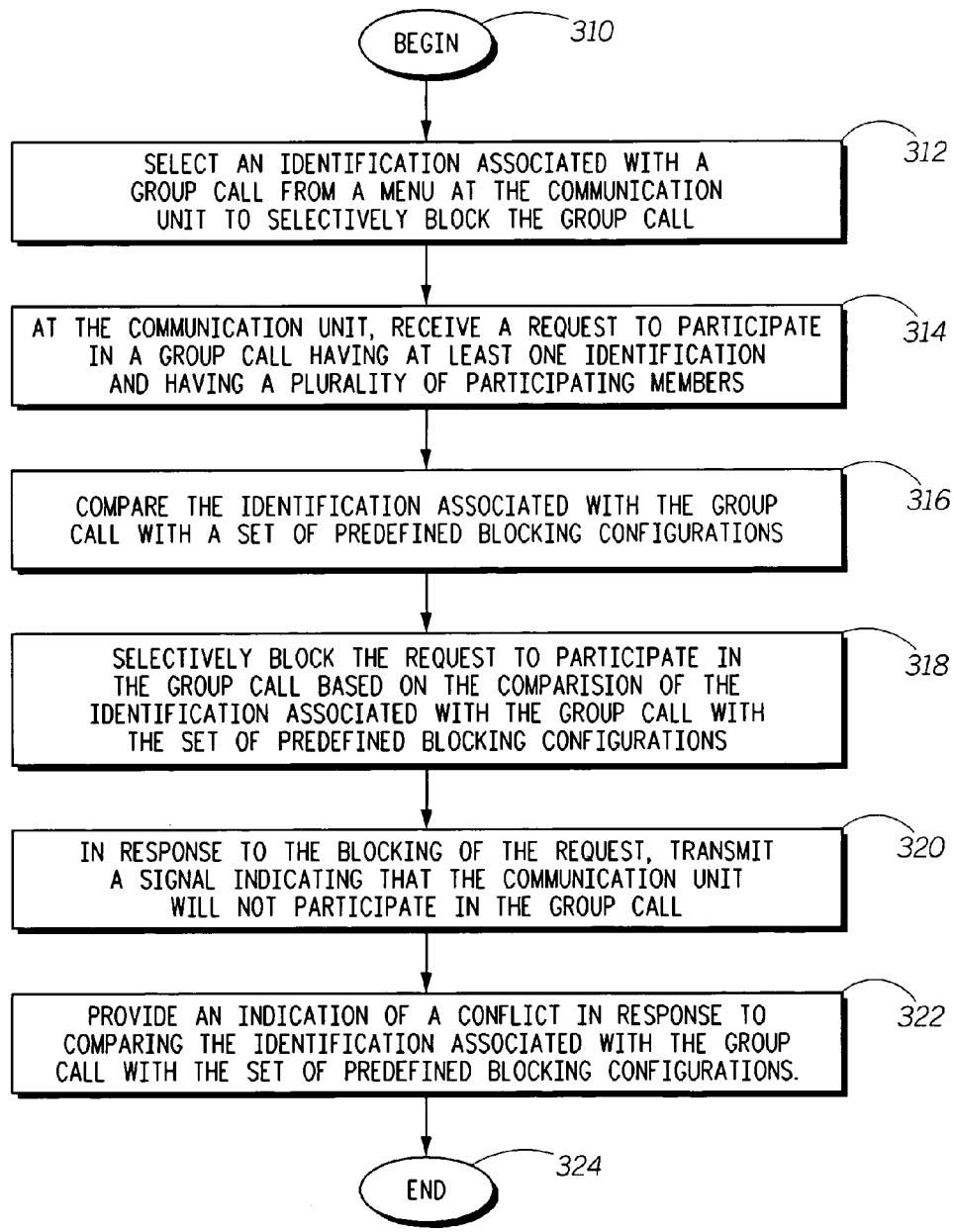
FIG. 3 illustrates a method for selective receipt of group calls in accordance with an embodiment of the inventive arrangements.

Referring to FIG. 3, a method 300 for selective receipt of a group call is shown. To describe the method 300, reference will be made to FIGS. 1 and 2, although it is understood that the method 300 can be implemented in any other suitable device or system using other suitable components. Moreover, the invention is not limited to the order in which the steps are listed in the method 300. In addition, the method 300 can contain a greater or a fewer number of steps than those shown in FIG. 3.

At step 310, the method 300 can begin. At step 312, an identification associated with a group call can be selected from a menu at a communications unit to selectively block the group call. At the communications unit, a request to participate in a group call can be received, as shown at step 314. The group call can have at least one identification and can have a plurality of participating members. The identification associated with the group call can be compared with a set a predefined blocking configurations, as shown at step 316. At step 318, the request to participate in the group call can be selectively blocked based on the comparison of the identification associated with the group call with the set of predefined blocking configurations.

Referring to FIGS. 1 and 2, a user of one of the communications units 112, such as the originating communications unit 114, may create a group having a plurality of members, as explained earlier. The user of the originating communications unit 114 can then select the group and can initiate a group call. Initially, the originating communications unit 114 and the target communications units 116 can be on a common control channel (CCCH). The communications network 110 can assign a dedicated control channel (DCCH) to the originating communications unit 114, which can forward an identifier associated with the members of the group over the DCCH. The communications network 110 can then assign a group identification number for the group and can signal the target communications units 116.

The target communications units 116 can respond by signaling the communications network 110 over the CCCH, which can indicate their capability to participate in the group call. The communications network 110 can then assign a traffic channel (TCH) to the originating communications unit 114 and the target communications units 116 to enable the group call to be conducted. Following the last transmission, the TCH can be torn down, and the originating communications unit 114 and the target communications units 116 can move back to the CCCH.

As a byproduct of this process, a record of the group and its members can be stored in, for example, the memory 120 of the target communications units 116 (in addition to the memory 120 of the originating communications unit 114). Thus, if a user of one of these communications units 112 wishes to initiate a group call for these members, the user can merely, for example, select a name associated with the group from a menu and press a PTT button. The group call can be set up once again in accordance with the discussion above.

There may come a time, however, when one of the intended participants does not wish to be in the group call. In accordance with the inventive arrangements, this user can selectively block these group calls. In particular, a user does not wish to participate in a group call can select an identification associated with the group call from a menu on the display 132 of his communications unit 112. As an example, the user can select the group name and can instruct his communications unit 112 to not accept a group call from the group. As another example, the user can select another user's name or number and instruct his communications unit 112 to not accept any group calls in which this other user is listed as a participating member. In yet another arrangement, the user can instruct his communications unit 112 to not accept group calls based on the status of at least one of the participating members. Examples of this process will be presented below. The processor 118 can transfer these selections to the memory 120, where they can be part of a set of configured blocking parameters.

If the user's communications unit 112 is target communications unit 116, i.e., the user has been listed to participate in a group call, the transceiver 122 of the target communications unit 116 can receive a request to participate in a group call. This group call can have at least one identification and can have a plurality of participating members. As an example, the identification of the group call can be a name of the group call, the names of the other intended participants and/or the status of at least one of the intended participants. In one arrangement, the status of the intended participants may indicate that the participant's communications unit 112 is turned on and available to participate in the group call. Alternatively, the status may indicate that the intended participant's communication unit 112 is turned off or is otherwise unavailable.

Once received, the processor 118 can compare the identification associated with the group call with the set of blocking configurations that are stored in the memory 120. Based on this comparison, the processor 118 can signal the transceiver 122 to ignore the incoming group call. For example, if the identification of the group call is the name of the group and this name has been stored in the set of predefined blocking configurations, then the group call can be blocked. Moreover, if the name of one or more of the group call participants is stored in the set of predefined blocking configurations, then any group call that has such a participant listed as part of the group can be blocked.

If the current status of one or more of the participants in the group call is within the set of predefined blocking configurations, then the group call may be blocked. For example, the status of one of the intended participants may indicate that such a participant is unavailable. If the predefined blocking configuration includes a requirement that the group call cannot be accepted unless this particular participant is available, then the group call can be blocked, even though the intended participant is actually part of the group.

If the identification associated with the group call is not within the predefined blocking configurations, then the processor 118 can signal the transceiver 122 to allow the group call to be received. It is understood that the identification associated with the group call can be any set of data that enables the communications unit 112 (or the user of the communications unit 112) to identify the group call or any number of the members of the group.

In addition to identifiers associated with groups or group members, there are other restrictions that may be part of the predefined blocking configurations. For example, a user may wish to avoid taking calls from a group or group member during a certain time period or when the user is in a particular location. For example, the processor 118, during the comparison step, can determine whether the incoming group call is allowed to take place based on the current time in view of a temporal restriction. If not, the processor 118 can cause the call to be blocked.

As another example, the processor 118 can determine from the GPS unit 126 the location of the communications unit 112. If the communications unit 112 is located at a certain area, such as a user's home, the processor 118 can block the group call based on this geographical restriction. These temporal and geographical restrictions may also apply to the status of one or more intended participants of a group call. Of course, the invention is not limited to any of the abovementioned examples, as any suitable criteria can be part of the predefined blocking configurations.

Referring back to the method 300 of FIG. 3, at step 320, in response to the request of the group call being blocked, a signal can be transmitted indicating that the communications unit will not participate in the group call. Further, at step 322, an indication of a conflict can be provided in response to the comparison of the identification associated with the group call with the set of predefined blocking configurations. The method 300 can end at step 324.

For example, referring once again to FIGS. 1 and 2, after the group call is blocked, as an option, the processor 118 can signal the transceiver 122 to transmit a signal to, for example, the communications network 110 (or to another communications unit 112). This signal can indicate that the target communications unit 116 will not participate in the group call. The communications network 110 can forward this signal to the other communications units 112, which can inform their users of the non-participation, such as through the display 132. A group member's participation may also be displayed on the display 132 or some other suitable user interface.

In addition to listing groups or group members in the set of predefined blocking configurations for blocking group calls, a user may also program his or her communications unit 112 to accept a group call from a particular group or one or more members of that group. For example, the user may wish to always accept group calls in which the user's supervisor is listed as a participant. This restriction may also require that the supervisor's status indicate that the supervisor is available to participate in the group call in which the supervisor is listed.

In view of this feature, there may be instances where a conflict is presented. As an example, a group call may include a first member who a user of a target communications unit 116 has designated to be blocked and a second member from whom the user has programmed the target communications unit 116 to always accept calls (including group calls). The processor 118, during the comparison step, can detect the conflict and can cause the user to be notified. As an example, the processor 118 can signal the display 134, the vibrator 136 or the speaker 138 to notify the user of the target communications unit 116 of the conflict. The user may take whatever action he or she wishes in response to the conflict.

In another arrangement, a user can program into his or her communications unit 112 a hierarchy of contacts in which potential group members are given an order of preference relating to the acceptance of their calls. This way, if a conflict is presented, the processor 118 can compare the members of the incoming group call with the hierarchy of contacts to resolve the conflict without any user interaction.

Figure 4:
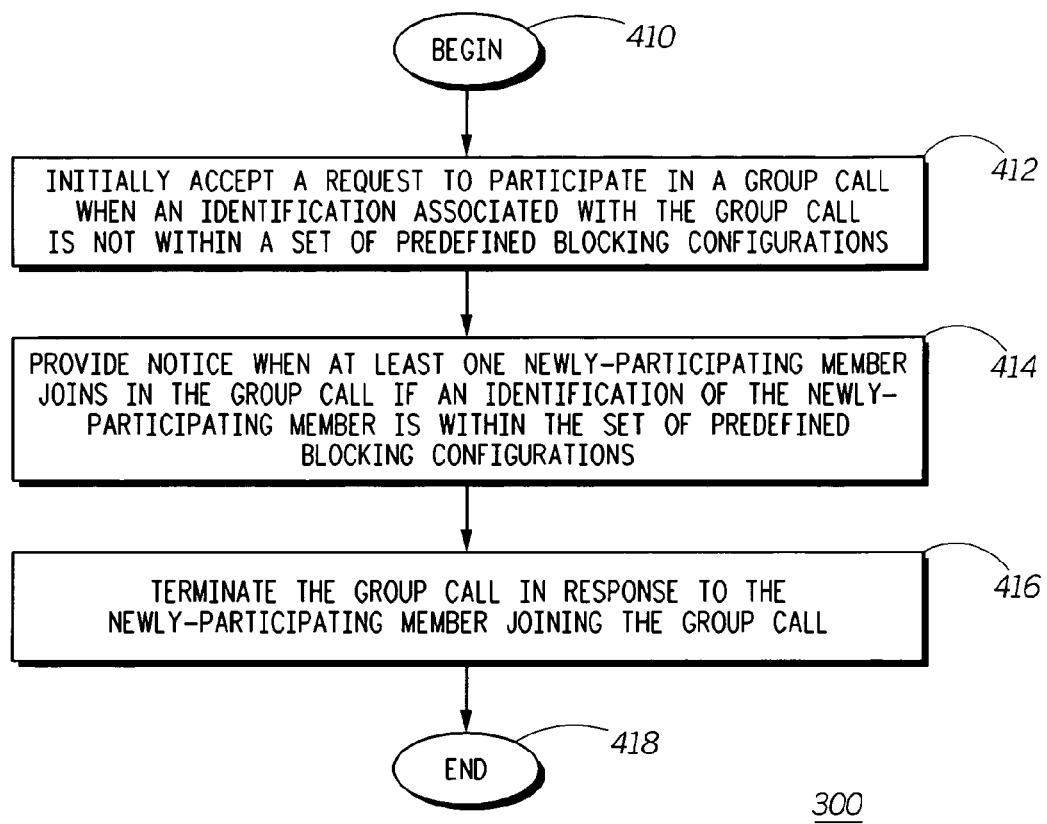
FIG. 4 illustrates another method for selective receipt of group calls in accordance with an embodiment of the inventive arrangements.

Referring to FIG. 4, another method 400 for the selective receipt of group calls is shown. This method 400 is similar to the method 300 of FIG. 3 in that a request to participate in a group call can be received and an identification of the group call can be compared to a set of predefined blocking configurations. At step 412, a request to participate in a group call can be initially accepted when an identification associated with the group call is not within a set of predefined blocking configurations. In addition, at step 414, notice can be provided when at least one newly-participating member joins in the group call if an identification of the newly-participating member is within the set of predefined blocking configurations. The group call can be terminated in response to the newly-participating member joining the call, as shown at step 416. The method 400 can then end at step 418.

For example, referring once again to FIGS. 1 and 2, the processor 118 can initially accept a request to participate in a group call when the processor 118 determines that an identification associated with the group call is not within the set of predefined blocking configurations. Like the example above, the identification can be the name of a group or one or more group members or a temporal or location restriction. Once accepted, the group call can proceed in which the group members may communicate with one another.

In this group call, as an example, there may be a group call member who is listed as part of the group but who is not initially participating in the group call. This group call member may be a person whose name is within the predefined blocking configurations of a target communications unit 116. The group member not participating initially in the group call, however, may change his or her mind and may wish to join in the group call. There may be one or more other users who do not wish to participate in a group call with this newly-participating member because the identifier for this newly-participating member is within a predefined blocking configuration. A newly-participating member can be a caller who may have been listed in a group but did not initially participate in a group call but who has taken action to join the group call. The communications network 110 (or a communication unit 112) can transmit a signal indicating the participation of this newly-participating member.

Accordingly, the processor 118 can detect the newly-participating member joining the group call and can compare the identification associated with this member to the predefined blocking configurations. If the newly-participating member's identification is within the blocking configurations, the processor 118 can notify the user of the target communications unit 116 though, for example, the display 132, the vibrator 136 or the speaker 138. The user may wish to terminate his participation in the group call. Alternatively, the processor 118 could automatically signal the transceiver 122 to terminate the group call. Of course, if the identifier of the newly-participating member is not within the predefined blocking configurations, the user of the target communications unit 116 may continue to participate in the group call.

Although reference was made to FIGS. 1 and 2, it is understood that the method 400 can be implemented in any other suitable device or system using other suitable components. Moreover, the invention is not limited to the order in which the steps are listed in the method 400. In addition, the method 400 can contain a greater or a fewer number of steps than those shown in FIG. 4.

Where applicable, the present invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. The present invention can also be embedded in a computer program product, which comprises all the features enabling the implementation of the methods described herein and which when loaded in a computer system, is able to carry out these methods.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for selective receipt of group calls, comprising:

at a communications unit, receiving a request to participate in a group call having at least one identification and having a plurality of participating members;

compare the identification associated with the group call with a set of predefined blocking configurations; and selectively blocking the request to participate in the group call based on the comparison of the identification associated with the group call with the set of predefined blocking configurations, wherein the identification associated with the group call includes identifications for each of the participating members of the group call and the set of predefined blocking configurations includes an identification of at least one participating member of the group call and the request to participate in the group call is blocked based on the identification of the participating member.

2. The method according to claim 1, wherein the identification associated with the group call is at least one of a group name or a status of at least one of the participating members.

3. The method according to claim 1, wherein the set of predefined blocking configurations includes at least one of a group name or a status of at least one of the participating members.

4. The method according to claim 3, wherein the set of predefined blocking configurations also includes at least one of a geographical restriction and a temporal restriction associated with at least one of the group name, the identification of the at least one participating member and the status of the participating members.

5. The method according to claim 1, further comprising the step of selecting the identification associated with the group call from a menu at the communications unit to selectively block the group call.

6. The method according to claim 1, in response to the blocking of the request, transmitting a signal indicating that the communications unit will not participate in the group call.

7. The method according to claim 1, further comprising the step of providing an indication of a conflict in response to comparing the identification associated with the group call with the set of predefined blocking configurations.

8. The method according to claim 1, further comprising the steps of:
   initially accepting the request to participate in the group call when the identification associated with the group call is not within the set of predefined blocking configurations; and
   providing notice when at least one newly-participating member joins in the group call if an identification of the newly-participating member is within the set of predefined blocking configurations.

9. The method according to claim 8, further comprising the step of terminating the group call in response to the newly-participating member joining the group call.

10. The method according to claim 1, wherein the communications unit is a mobile communications unit.

11. A communications unit for selectively blocking a group call, comprising:
   a transceiver, wherein the transceiver receives a request to participate in a group call having at least one identification and having a plurality of participating members; and
   a processor coupled to the transceiver, wherein the processor is operable to:
      compare the identification associated with the group call with a set of predefined blocking configurations; and
      selectively block the request to participate in the group call based on the comparison of the identification associated with the group call with the set of predefined blocking configurations, wherein the identification associated with the group call includes identifications for each of the participating members of the group call and the set of predefined blocking configurations includes an identification of at least one participating member of the group call and the request to participate in the group call is blocked based on the identification of the participating member.

12. The communications unit according to claim 11, wherein the identification associated with the group call is at least one of a group name or a status of at least one of the participating members.

13. The communications unit according to claim 11, wherein the set of predefined blocking configurations includes at least one of a group name or a status of at least one of the participating members.

14. The communications unit according to claim 13, wherein the set of predefined blocking configurations also includes at least one of a geographical restriction and a temporal restriction associated with at least one of the group name, the identification of the at least one participating member and the status of the participating members.

15. The communications unit according to claim 11, further comprising a user interface section, wherein the user interface section is capable of displaying a menu to permit a user to select the identification associated with the group call to selectively block the group call.

16. The communications unit according to claim 11, wherein in response to the blocking of the request, the transceiver transmits a signal indicating that the communications unit will not participate in the group call.

17. The communications unit according to claim 11, further comprising a user interface section, wherein the processor is further operable to provide an indication of a conflict through the user interface section in response to comparing the identification associated with the group call with the set of predefined blocking configurations.

18. The communications unit according to claim 11, further comprising a user interface section and wherein the processor is further operable to:
   initially accept the request to participate in the group call when the identification associated with the group call is not within the set of predefined blocking configurations; and
   provide notice through the user interface section when at least one newly-participating member joins in the group call if an identification of the newly-participating member is within the set of predefined blocking configurations.

19. The communications unit according to claim 18, wherein the processor is further operable to terminate the group call in response to the newly-participating member joining the group call.

20. The communications unit according to claim 11, wherein the communications unit is a mobile communications unit.

* * * * *